(12) United States Patent
Flaschka et al.

(10) Patent No.: US 6,640,276 B2
(45) Date of Patent: Oct. 28, 2003

(54) BUS SYSTEM AND METHOD FOR ACHIEVING A STABLE BUS REDUNDANCY

(75) Inventors: Elmar Flaschka, Fuerth (DE); Clemens Hoga, Nuernberg (DE)

(73) Assignee: Siemens Aktiengesellschaft, Munich (DE)

(*) Notice: Subject to any disclaimer, the term of this patent is extended or adjusted under 35 U.S.C. 154(b) by 403 days.

(21) Appl. No.: 09/735,515

(22) Filed: Dec. 14, 2000

(65) Prior Publication Data

US 2003/0037272 A1 Feb. 20, 2003

Related U.S. Application Data

(63) Continuation of application No. PCT/DE00/01096, filed on Apr. 10, 2000.

(30) Foreign Application Priority Data

Apr. 14, 1999 (DE) .......................... 199 16 894

(51) Int. Cl.$^7$ .......................... G06F 13/14; G06F 13/00; G06F 13/24; G01R 31/08
(52) U.S. Cl. .................. 710/305; 710/100; 710/301; 710/260; 370/223
(58) Field of Search .................. 710/100, 305, 710/260, 301; 370/223

(56) References Cited

U.S. PATENT DOCUMENTS 5,307,353 A * 4/1994 Yamashita et al. ............ 714/4
5,790,520 A * 8/1998 Iwamoto et al. ............ 370/223
5,920,267 A * 7/1999 Tattersall et al. ............ 370/258
6,400,682 B1 * 6/2002 Regula ........................ 370/223

FOREIGN PATENT DOCUMENTS

EP 0551 114 A1 7/1993

OTHER PUBLICATIONS

Oshima K et al: "Fibre Optic TDMA System for Passive Local Networks," Conference Europeene sur les Communications Optiques, Sep. 1982, pp. 553–558.

Internet Address: http://www.siemens.de/kwu/d/foa/l/products/prod160.htm (Jan. 1999).

* cited by examiner

*Primary Examiner*—Tim Vo
(74) *Attorney, Agent, or Firm*—Sughrue Mion, PLLC

(57) ABSTRACT

A bus system interconnected to a coupling module to form a ring structure for reasons of redundancy, whereby a linear structure of the bus (1) is achieved through a partition (9) in the coupling module (8). A monitoring device (11) contained in the coupling module (8) monitors the bus (1) for like conditions on both sides of the partition (9), which is closed by a controllable switching device (10) in the event of a discrepancy. According to the bus system, and method of detecting discrepancy in the bus, an especially simple and stable bus redundancy is achieved in that the bus (1) is provided with cables for supplying power to the bus stations (2 . . . 6) and in that the supply voltage is monitored on the cables on both sides of the partition (9).

19 Claims, 1 Drawing Sheet

BUS SYSTEM AND METHOD FOR ACHIEVING A STABLE BUS REDUNDANCY

This is a Continuation of International Application PCT/DE00/01096, with an international filing date of Apr. 10, 2000, which was published under PCT Article 21(2) in German, and the disclosure of which is incorporated into this application by reference.

FIELD OF AND BACKGROUND OF THE INVENTION

The invention is in the field of bus systems with a bus interconnected to a coupling module to form a ring structure, whereby a linear structure of the bus is achieved through a partition in the coupling module. The bus system is also equipped with a monitoring device contained in the coupling module, which monitors the bus for identical conditions on both sides of the partition and closes the partition via a controllable switch device in the case of a discrepancy.

Such a bus system is known from Siemens Energy Production KWU: Instrumentation Technology Energy Production: Products & Services: Bus System SIMATIC NET, online on the Internet: URL: http://www.siemens.de/kwu/d/foa/1/products/prod160.htm (as of Jan. 29, 1999). In this known bus system, the bus stations are connected via star connections to a bus. In order to increase the bus system's availability and error protection, the bus is interconnected with the star connections to form a ring structure, whereby a linear structure is achieved by a partition in one of the star connections. Signals (telegrams) coming from both directions are monitored at the partition. If the signals come only from one direction, it must be assumed that there has been an interruption of the bus. In this case, the partition is closed by a controllable switch, thus reforming a closed linear structure of the bus, and all bus stations can communicate with each other again via the bus.

Monitoring the bus for identical telegrams on both sides of the partition is relatively difficult and can be associated with delays due to the necessity of evaluating the telegrams. In addition, the monitoring function is only effective while telegrams are being transmitted via the bus.

OBJECTS OF THE INVENTION

One object of the present invention is to guarantee an especially simple and stable bus redundancy.

SUMMARY OF THE INVENTION

In accordance with the present invention, these and other objects are solved by providing a bus system and method wherein power is supplied to the bus stations and a monitoring device records and compares the supply voltage on both sides of the partition.

According to the system and method of the invention, in bus systems that transmit both telegrams and supply voltage to the bus stations on the same bus, it is the supply voltage, and not necessarily the telegrams, that is monitored and compared on both sides of the partition in order to detect a bus interruption. The monitoring of the supply voltage in accordance with the invention is simple, malfunction-proof and even possible at times when no telegrams are being transmitted. In principle, the invention is appropriate to all buses in which the power supply and data transfer takes place via the same cable, regardless of whether the telegrams are modulated to the supply voltage for the bus stations, or if the telegrams and the supply voltage are transmitted via separate leads, as for example in the optical transfer of data.

In order to notify the bus stations, especially the bus master (active bus station), if there is a bus interruption, the coupling module preferably contains a bus station device that is linked to the bus The monitoring device directs the bus station device to send an error message to the bus in the event that a discrepancy between the supply voltage on both sides of the partition is detected. It is advantageous for the error message to contain information about the side of the partition on which the supply voltage was found to fall below the minimal value, so that it is easier to ascertain the bus interruption location in relation to the position at which the supply voltage is fed into the bus.

The controllable switching device that serves to close the partition is preferably also controllable by a command that is transferred to the bus station device via the bus. The bus master can then specifically open and close the partition to test the coupling module and to put the repaired bus back into operation following an interruption. Alternatively or preferably, the coupling module can also be equipped with a manually operable control element and/or a separate control signal input for operating the controllable switching device.

BRIEF DESCRIPTION OF THE DRAWINGS

The invention and further advantageous refinements of the invention are explained in more detail below with the aid of exemplary embodiments and the drawing figures in the form of block circuit diagrams.

DETAILED DESCRIPTION OF THE PREFERRED EMBODIMENTS

Figure 1:
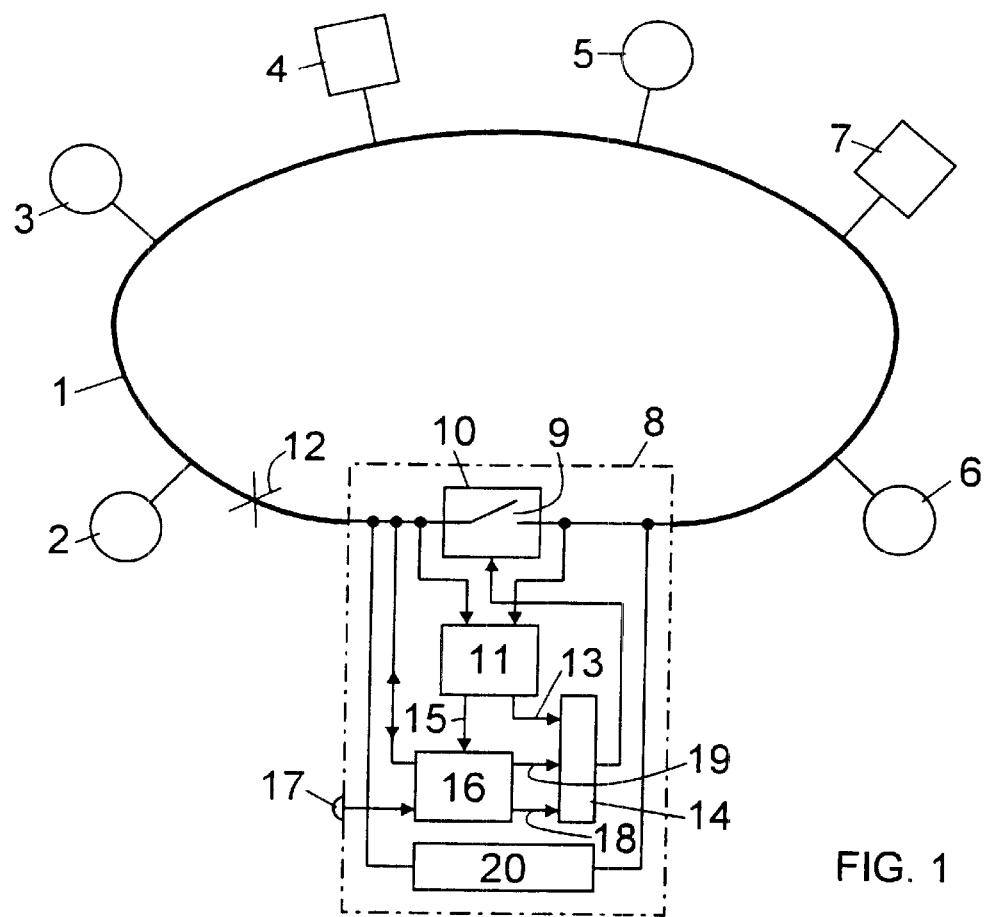
FIG. 1 shows an example of an embodiment of the bus system according to the invention.

FIG. 1 shows a bus system, including a bus 1 with bus stations 2 . . . 6 connected thereto, and of which bus station 4 is designed as the bus master, i.e. the active bus station, and the other bus stations 2, 3, 5, 6 are designed as bus slaves, i.e. passive bus stations. Bus 1 serves to transmit telegrams, i.e. information, between the bus stations 2 . . . 6, and supplies bus stations 2 . . . 6 with the supply voltage. For this purpose, an AC power adapter 7 for supplying the supply voltage is attached to bus 1. The ends of bus 1 are interconnected to a coupling module 8 to form a ring structure, although it is actually a linear structure of the bus 1 that is achieved by means of a partition 9 in the coupling module 8.

The coupling module 8 contains a controllable switching device 10, through which the normally open partition 9 can be closed and re-opened, as well as a monitoring device 11, which records the supply voltage values of the bus 1 on both sides of the partition 9 and compares these voltage values to one another. This comparison includes performing a diagnosis of whether the supply voltage supplied by the AC power adapter 7 is present on each of the respective sides of the partition 9, or whether there is no supply voltage due to an interruption 12 of the bus 1. The presence of the supply voltage is detected when, for example, the detected voltage value exceeds a pre-determined threshold value, while the absence of the supply voltage is detected when, for example, the detected voltage value falls below a minimal value. The detecting and monitoring of the supply voltage on both sides of the partition 9 can also be simplified by detecting the voltage across the partition 9.

If the interruption 12 of bus 1 is detected on the basis of different supply voltages on both sides of the partition 9, the monitoring device 11 will generate a set signal 13, which sets a register 14 that controls the switching device 10. As a result, the partition 9 is closed by means of the switching device 10. This restores the linear structure of the bus 1 and the bus stations 2 . . . 6 are again able to communicate with one another.

At the same time that it generates the set signal 13, the monitoring device 11 generates an error message signal 15, which is fed to a passive bus station device (slave) 16 in the coupling module 8. The bus station device 16, which is connected to the bus 1 in the same way as the bus stations 2 . . . 6, then sends an error message to bus 1. This error message is then received by the bus stations, in particular the bus master 4. The error message contains information about the side of the partition 9 on which the absence of the supply voltage has been detected, thus making it easier to locate the interruption 12.

After the interruption 12 in the bus 1 has been eliminated, the partition 9 can be re-opened, either by means of a command transmitted to the bus station device 16 by the bus master 4 or by manually activating a control element 17 attached to the coupling module 8. The bus station device 16 then generates a reset signal 18, which resets the register 14 that controls the switching device 10. The bus station device 16 can, in addition, generate a set signal 19 for setting the register 14, in accordance with a command transmitted to the bus station device 16 via bus 1 or in accordance with the activation of the control element 17, so that the partition 9 can be opened and closed for testing and for being put back into operation.

For its power supply, the coupling module 8 contains a power supply device 20, which is connected to the bus 1 on both sides of the partition 9, and from which the supply voltage is received.

As mentioned above, both the bus telegrams and the supply voltage are transmitted via the bus 1. The telegrams and the supply voltage can either be transmitted via separate leads or through one common lead of the bus 1. In the latter case, the telegrams are modulated onto the supply voltage.

Figure 2:
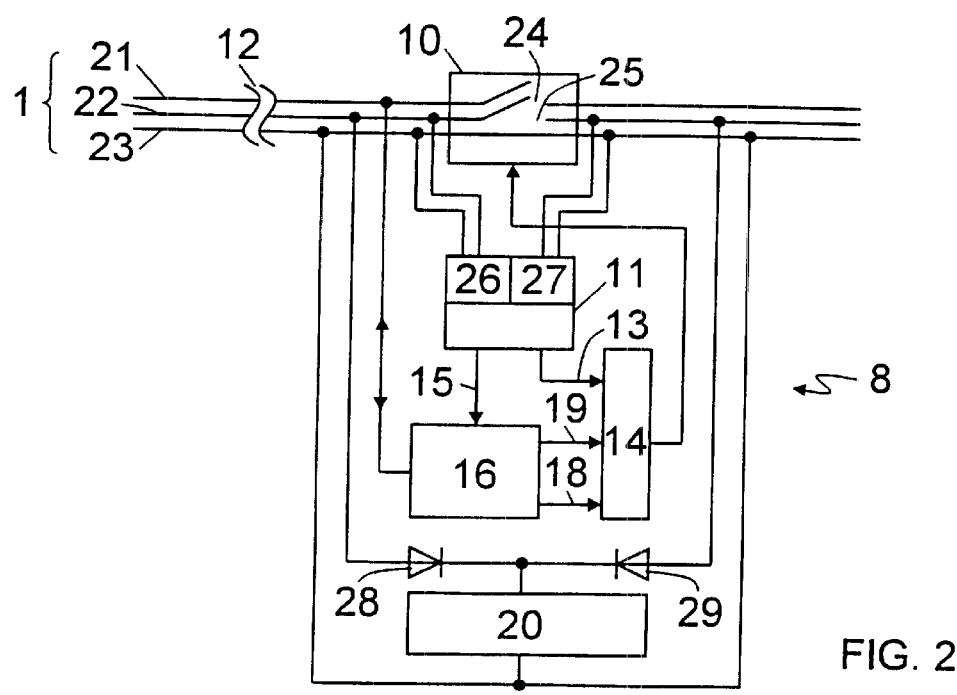
FIG. 2 shows an example of an embodiment of the bus link according to the invention.

FIG. 2 shows an embodiment of the coupling module 8, which is linked to a bus 1 through a first lead 21 for the transmitting telegrams, a second lead 22 for transmitting the supply voltage and a third lead 23 as a ground line. The lead 21 that transmits telegrams can be an electric line or a fiber optic line.

A partition 24, 25 that can be opened or closed by means of the controllable switching device 10 is provided for each of the leads 21 and 22 and, if necessary, for the lead 23 as well. The remaining components of the coupling module 8 correspond to those in FIG. 1 and are provided with the same reference numbers.

It can also be seen that the supply voltage is detected on both sides of the partition 25 by the monitoring device 11 via filters 26 and 27. These filters 26 and 27 suppress the interference voltages and serve to adjust the level to the logic level of the logical switch of the monitoring device 11.

The power supply device 20 is connected via de-linking diodes 28 and/or 29 to the lead 22 of the bus 1, thus preventing the partition 25 from shorting out.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. Bus system comprising:

a coupling module comprising a partition and a monitoring device;

a bus connected to the coupling module to form a ring structure; and at least one bus station connected to the bus, wherein a linear structure of the bus is achieved through the partition in the coupling module, the bus comprises at least one lead for supplying power to the bus station, and the monitoring device monitors the bus for matching conditions on both sides of the partition by comparing the supply voltage on the lead on both sides of the partition.

2. Bus system according to claim 1, wherein the coupling module further comprises a bus station device linked to the bus, and the monitoring device directs the bus station device to send an error message to the bus in the event that a discrepancy in the supply voltage between both sides of the partition is detected.

3. Bus system according to claim 1, wherein the monitoring device further comprises a controllable switch device, and the monitoring device closes the partition via the controllable switch device in the case of a discrepancy in the conditions between both sides of the partition.

4. Bus system according to claim 1, wherein the monitoring device records the supply voltage.

5. Bus system according to claim 1, further comprising a second lead, connected to both sides of the partition, for transmitting telegrams to the bus station.

6. Bus system according to claim 1 further comprising a third lead which is a ground line.

7. Bus system according to claim 1, wherein the coupling device further comprises a power supply connected to both sides of the partition.

8. Bus system according to claim 1 further comprising a plurality of bus stations connected to the bus, wherein the lead supplies power to the bus stations.

9. Bus system according to claim 2, wherein the error message comprises information about the side of the partition on which the supply voltage falls below a minimal value.

10. Bus system according to claim 2, wherein the coupling device further comprises a register, and the bus station device generates a set signal thereby setting the register for opening and closing the partition.

11. Bus system according to claim 3, wherein the coupling module further comprises, for activating the controllable switch device, at least one of a manually activated control device and a separate control signal input.

12. Bus system according to claim 3, wherein the controllable switching device is controlled via a command transmitted to the bus station device via the bus.

13. Bus system according to claim 7, wherein the power supply is connected to both sides of the partition via de-linking diodes.

14. Bus system according to claim 13, wherein the power supply is further connected to the lead.

15. A method for monitoring a bus connected to a coupling module to form a ring structure, the coupling module comprising a partition and a monitoring device, with at least one bus station connected to the bus, wherein a linear structure of the bus is achieved through the partition in the coupling module, said method comprising:

monitoring the bus for like conditions on both sides of the partition;

supplying voltage to the bus station; and comparing the supply voltage on the lead on both sides of the partition.

16. The method according to claim 15 further comprising sending an error message to the bus in the event that a discrepancy in the supply voltage between both sides of the partition is detected.

17. The method according to claim 15 further comprising closing the partition in the case of a discrepancy in the conditions between both sides of the partition.

18. The method according to claim 15 further comprising recording the supply voltage.

19. The method according to claim 16, wherein the error message comprises information about the side of the partition on which the supply voltage falls below a minimal value.

* * * * *